Oct. 4, 1949.  W. R. GOSS  2,483,898
BRUSH HOLDER
Filed Sept. 25, 1946
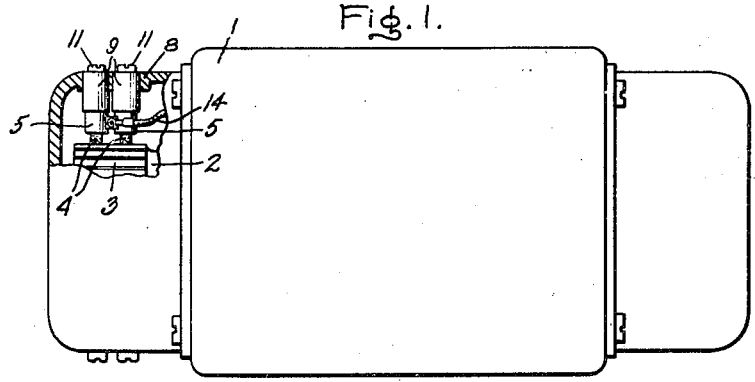
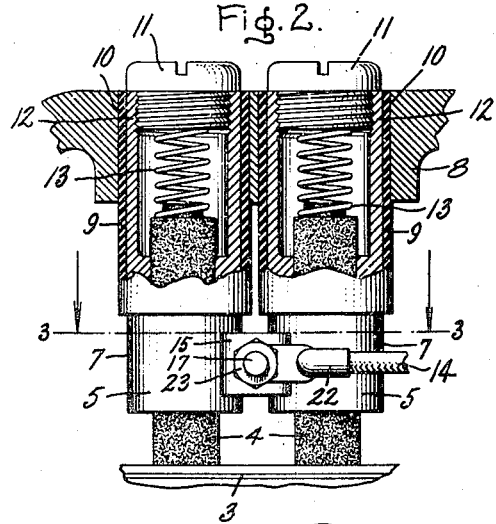
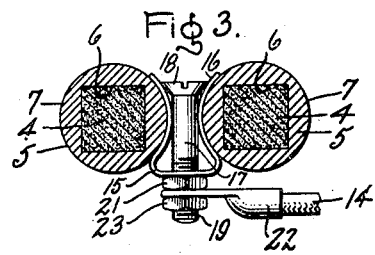
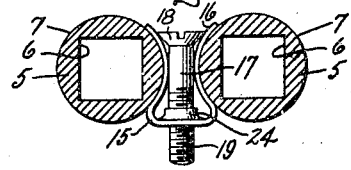
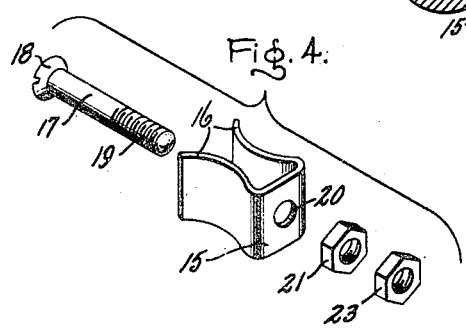
Inventor:
Wesley R. Goss,
by Prowell P. Mack
His Attorney Patented Oct. 4, 1949

2,483,898

UNITED STATES PATENT OFFICE 2,483,898

BRUSH HOLDER

Wesley R. Goss, Fort Wayne, Ind., assignor to General Electric Company, a corporation of New York Application September 25, 1946, Serial No. 699,262

1 Claim. (Cl. 173—269)

My invention relates to brush holders and particularly to an improved lead clip assembly for a double brush holder construction.

An object of my invention is to provide an improved lead clip assembly for a double brush holder construction.

Further objects and advantages of my invention will become apparent and my invention will be better understood from the following description referring to the accompanying drawing, and the features of novelty which characterize my invention will be pointed out with particularity in the claim annexed to and forming part of this specification.

In the drawing, Fig. 1 is a side elevational view partly broken away illustrating an application of my improved brush holder and lead clip to a dynamoelectric machine; Fig. 2 is an enlarged view of the brush holder construction shown in Fig. 1 partly broken away to show the details of the brush holder; Fig. 3 is a sectional view taken along line 3—3 of Fig. 2; Fig. 4 is an exploded perspective view of the lead clip shown in Figs. 1, 2, and 3; and Fig. 5 is a sectional view similar to Fig. 3 illustrating another embodiment of my improved lead clip.

Referring to the drawing, I have shown in Figs. 1, 2, 3, and 4 an embodiment of my improved brush holder applied to a rotating electric machine, such as a generator, having a stationary member 1 and a rotatable member 2 provided with a suitable current collector, such as a commutator 3. In order to supply current to the rotatable member 2 of the machine, brushes are provided which are adapted to form an electrical contact with the commutator 3 and to be electrically connected to a suitable stationary terminal for a source of electrical power supply. This connection between the rotatable member 2 and the stationary terminals for a source of electrical power supply includes the provision of brushes 4 which may be made of any suitable material, such as graphite, or some other carbonaceous material or a mixture of carbonaceous and metallic materials as may be found desirable for the particular characteristics of the equipment and the uses to which it is to be applied. These brushes 4 are arranged in the brush holders and are adapted to move longitudinally therein to compensate for variations in the surface of the commutator 3. In this construction, a double brush holder is provided including a pair of brush guide members 5 formed with brush openings or guideways 6 therein and formed with substantially cylindrical outer surfaces 7. These brush guide members are formed of electrically conductive material, such as brass, and are adapted to be mounted in a suitable supporting member, such as an end shield 8 connected to the stationary member 1 of the machine and are insulated therefrom by substantially cylindrical sleeves 9 formed of suitable insulating material, such as fiber, and arranged around a portion of the outer surfaces of the brush guide members 5 with a press fit and also press fitted into openings 10 in the mounting member 8. Brush holder caps 11 threadedly engage the outer ends 12 of the brush guide members 5 to prevent the entrance of foreign substances into the brush holders and also to form stops for resilient coil springs 13 arranged between the inner sides of the caps 11 and the outer ends of the brushes 4 for biasing the brushes away from the caps and into good electrical contact with the surface of the commutator 3.

The brush guide members 5 are electrically connected to a suitable terminal source of electrical power supply by a lead 14 which is electrically connected to the brush holder guide members by a lead clip assembly which includes a wedge or U-shaped contact clip member formed of a base 15 and a pair of separable wedge arms or elements 16 which extend from the base 15 and are formed with arcuate contours substantially complementary to the outer surfaces of the brush guide members, as is more clearly shown in Fig. 3. These wedge arms are arranged in contact with the brush guide members with the base 15 on one side thereof and a locking bolt member 17 extending between adjacent sides of the wedge arms 16 between the brush guide members 5 and formed with a head 18 for spreading apart the wedge arms 16 into contact with the brush guide members. This head 18 forms a stop and a spreader and is preferably provided with a tapered inner surface, as shown in Fig. 3, which further acts as a wedge for spreading apart the wedge arms 16 and also is provided with a threaded shank portion 19 which extends through an opening 20 in the base 15 and threadedly engages a nut 21 or other suitable element for biasing the base 15 toward the brush guide members 5 for locking the lead clip in good mechanical and electrical contact therewith. The lead 14 then may be electrically connected to the end of the bolt member 17 in any suitable manner, and is shown as provided with a terminal 22 arranged over an end of the bolt member 17 and locked in position by a nut 23 which threadedly engages the end 19 of the bolt 17.

With this improved brush holder and terminal lead clip, a simple electrical connection is made between the brush holders and the stationary lead terminal, and, in addition, the wedging action of the lead clip provides a slight sidewise pressure on the two brush holders in their supporting member, thereby substantially eliminating slippage of the brush holders in the openings in the mounting member. If desired, a suitable cement may be applied around the outer surface of the insulating members 9 where these members engage the sides of the holes 10 in the mounting member 8.

In Fig. 5 I have shown another embodiment of my improved brush terminal clip member in which the base 15 of the clip is formed with an extruded or pressed element 24 extending as a flange around the bolt opening 20 and is formed with a threaded inner surface so that the bolt member 17 may be threaded directly into the threaded element 24 of the base 15 for biasing the base toward the brush guide members 5, thereby eliminating the necessity of an additional separable threaded element, such as the nut 21 shown in Fig. 3. The remainder of the double brush holder construction shown in Fig. 5 may be the same as that shown in Figs. 1, 2, and 3, and similar reference numerals in this figure refer to corresponding parts in these other figures of the drawing.

While I have illustrated and described a particular embodiment of my invention, modifications thereof will occur to those skilled in the art. I desire it to be understood, therefore, that my invention is not to be limited to the particular arrangement disclosed, and I intend in the appended claim to cover all modifications which do not depart from the spirit and scope of my invention.

What I claim as new and desire to secure by Letters Patent of the United States is:

Lead clip assemblies for a double brush holder with a pair of brush guide members of electrically conductive material formed with substantially cylindrical outer surfaces, said lead clip assembly including a U-shaped contact clip member formed with a base and a pair of separable arms extending from said base between said brush guide members with arcuate contours substantially complementary to the outer surfaces of said brush guide members and arranged in contact therewith with said base on one side of said brush guide members, and means including a locking bolt extending between said arms with a head thereon on the side of said guide members away from said base for spreading apart said arms into good electrical contact with said brush guide members and a threaded shank portion thereon extending through said base and engaging a threaded element for biasing said base toward said brush guide members and locking said lead clip in good mechanical and electrical contact with said brush guide members.

WESLEY R. GOSS.

REFERENCES CITED

The following references are of record in the file of this patent:

UNITED STATES PATENTS

| Number | Name | Date |
|---|---|---|
| 1,378,565 | Schou | May 17, 1921 |
| 1,405,596 | Karle | Feb. 7, 1922 |
| 1,748,536 | Borden | Feb. 25, 1930 |
| 2,003,602 | Marians | June 4, 1935 |
| 2,126,674 | Stout | Aug. 9, 1938 |
| 2,325,698 | Millermaster et al. | Aug. 3, 1943 |